Sept. 3, 1968   A. RAVIN   3,399,467
HEART SOUND SIMULATOR
Filed Jan. 27, 1966   2 Sheets-Sheet 1

INVENTOR.
ABE RAVIN
BY
ATTORNEY

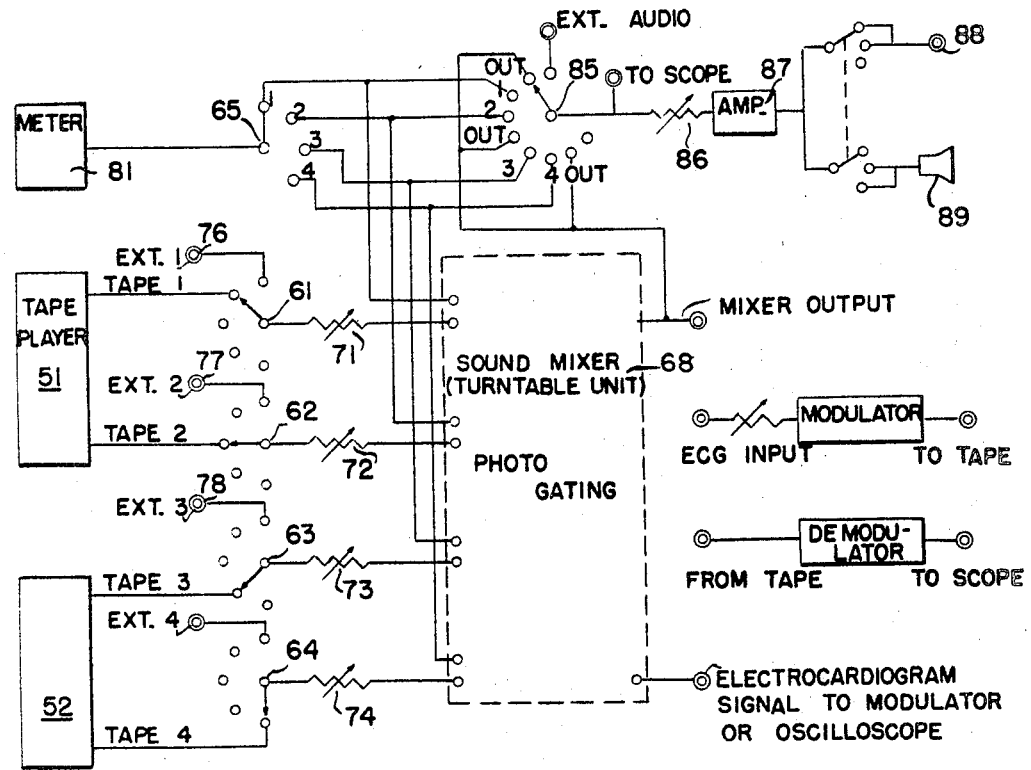
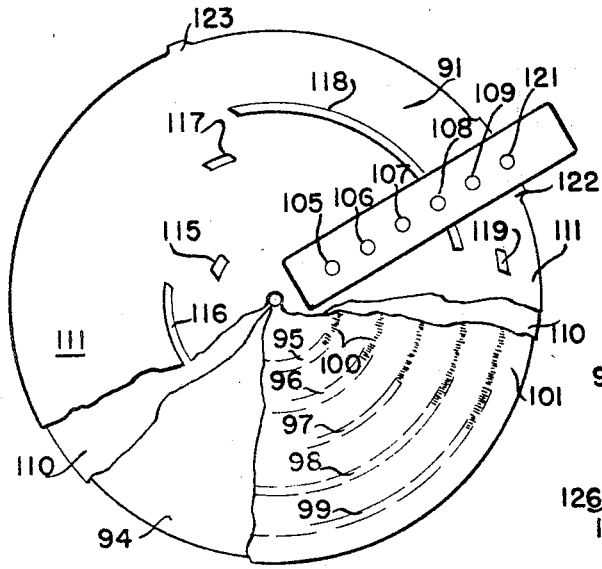
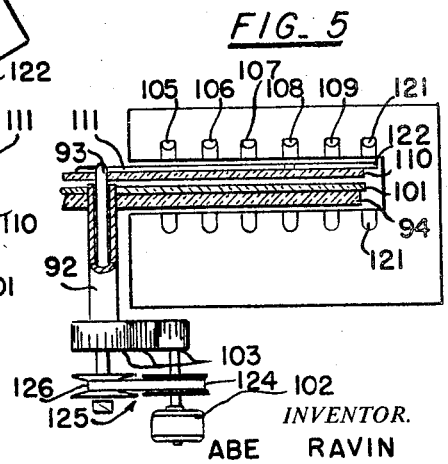

United States Patent Office 3,399,467
Patented Sept. 3, 1968

3,399,467
HEART SOUND SIMULATOR
Abe Ravin, 45 S. Dahlia St., Denver, Colo. 80222
Filed Jan. 27, 1966, Ser. No. 523,351
15 Claims. (Cl. 35—17)

ABSTRACT OF THE DISCLOSURE

A heart sounds simulator for the teaching of cardiac auscultation which utilizes signal gating apparatus for controlling the emission and recombination of separate sound bands of selective frequency to assemble or build up a multiband combined sound and to release the separate or combined signals in cyclic and timed sequence to simulate a heart pulse. The separate bands of sound are prerecorded or are band filtered from a sound generator source. Photosensitive signal gating and sound generating components are utilized in various embodiments of the invention. A simulated electrocardiogram signal may be produced simultaneously with the released heart sounds and may be recorded with the sounds for later presentation through use of modulator-demodulator circuits.

---

The instruments disclosed herein have been developed and utilized to satisfy a long recognized requirement for some better means for imparting the full knowledge and analytical techniques of experts in the field of heart auscultation to students and other practitioners who may not previously have had opportunity to observe particular diseases or deficiencies in patients. The instruments are also intended to provide means whereby an instructor-doctor can impart knowledge of heart sounds and of the suspected associated deficiencies to students or other observers under controlled conditions which assure that the student or listener will be able to make a proper observation of the specific difficulty.

In accomplishment of such objective, it is the inventor's intent to provide instruments which can selectively isolate any specific component of an overall heart sound so that the specific component can be accented for easier identification before it is subsequently sublimated in the regular background noises and otherwise interfering sounds of the heart. In order to accomplish this desirable result, the instrument uses an artificial or manufactured heart sound which is made up of separate component sounds. Use of the manufactured total heart sound makes it possible to accentuate any particular component, while other or extraneous sounds are excluded. The accentuation of individual sounds is an advantage of prime importance providing utility beyond an original objective directed to elimination of the requirement for having an actual patient as a source of heart sounds.

The new instruments, accordingly, avoid the shortcomings of traditional heart sounds instruction operations in which a doctor instructor would separately introduce each of his students or a team of students to the sounds of normal hearts or that of selected patients having suspected deficiencies. Under such earlier techniques the availability of patients having specific diseases or deficiencies was a prime requirement for the teaching of diagnostic techniques. Necessarily, all known deficiencies could not be demonstrated at any particular time under such conditions.

The unavailability of patients has previously led to the usage of recordings of actual heart sounds so that students, consultants or other doctors might review the recorded heart sounds. Instructional functions that were dependent upon either of the previous methods were always hampered by a further problem, inasmuch as it was never possible to positively ascertain whether or not the student was properly hearing and identifying the particular deficiency being demonstrated. Background noises of the heart or of other vital organs of the patient could often interfere with the separate identification of the particular sound which might indicate a heart operational deficiency. Accordingly even though the student's attention was closely directed to the particular deficiency there was previously no assurance that the student could hear and identify the particular sound. Likewise, there was no assurance that the student could later re-identify the symptom in another patient.

Where the sounds may be separated and accented either by amplification or by slowing or speeding up the simulated heart cycle without distortion of the frequency vibration of the characteristic sound, the student or doctor can more easily identify the individual sounds made by a normal or by a damaged heart so that the same sound can later be more readily recognized in the diagnosis of actual patient heart sounds. This desirable result is beneficially accomplished by instruments made in accordance with the present invention, and, accordingly, it is believed that the inventor presents improvements which fully satisfy overall objectives embodied in such desired result.

The present invention is further directed to the solution of other specific objectives, some of which may be listed as follows:

To provide an instrument which can simulate heart sounds by selectively combining sounds of different frequencies in a scheduled cyclic pattern;

To provide such an instrument which makes it possible to accent any of the particular sound components that are used to make up an overall heart sound;

To provide an instrument in which the relative time spacing of different heart sound components may be adjusted each to simulate changed heart sound conditions or to facilitate the addition or superimposition of further sounds which might be characteristic of heart disease or abnormality;

To provide an instrument in which the cyclic rate of the presented heart sounds may be adjusted to simulate variable pulse rates without distortion of the frequency rate of characteristic sounds;

To provide an instrument which can be used by individuals or by groups engaged in the study of heart sounds;

To provide an instrument which can be used to produce a recording of heart sounds which may be sold and used by others that do not have access to the heart sound simulator instrument itself; and To provide separate electronic and mechanical or electromechanical means for the creation, amplification, distribution and display of component heart sounds.

Further objects and advantages of the present invention will be apparent from the appended description and drawings which suggest further advantages as well as some potential modifications for instruments made in accordance with this invention. In the drawings FIG. 1 is a schematic layout for a preferred embodiment of the invention;

FIG. 3 is a schematic representation of a second embodiment of the invention;

FIG. 4 is a diagramatic layout for a further embodiment of the invention; and

FIG. 5 is a cross-sectional elevation showing further features of the embodiment of FIG. 4.

Figures 1, 2:
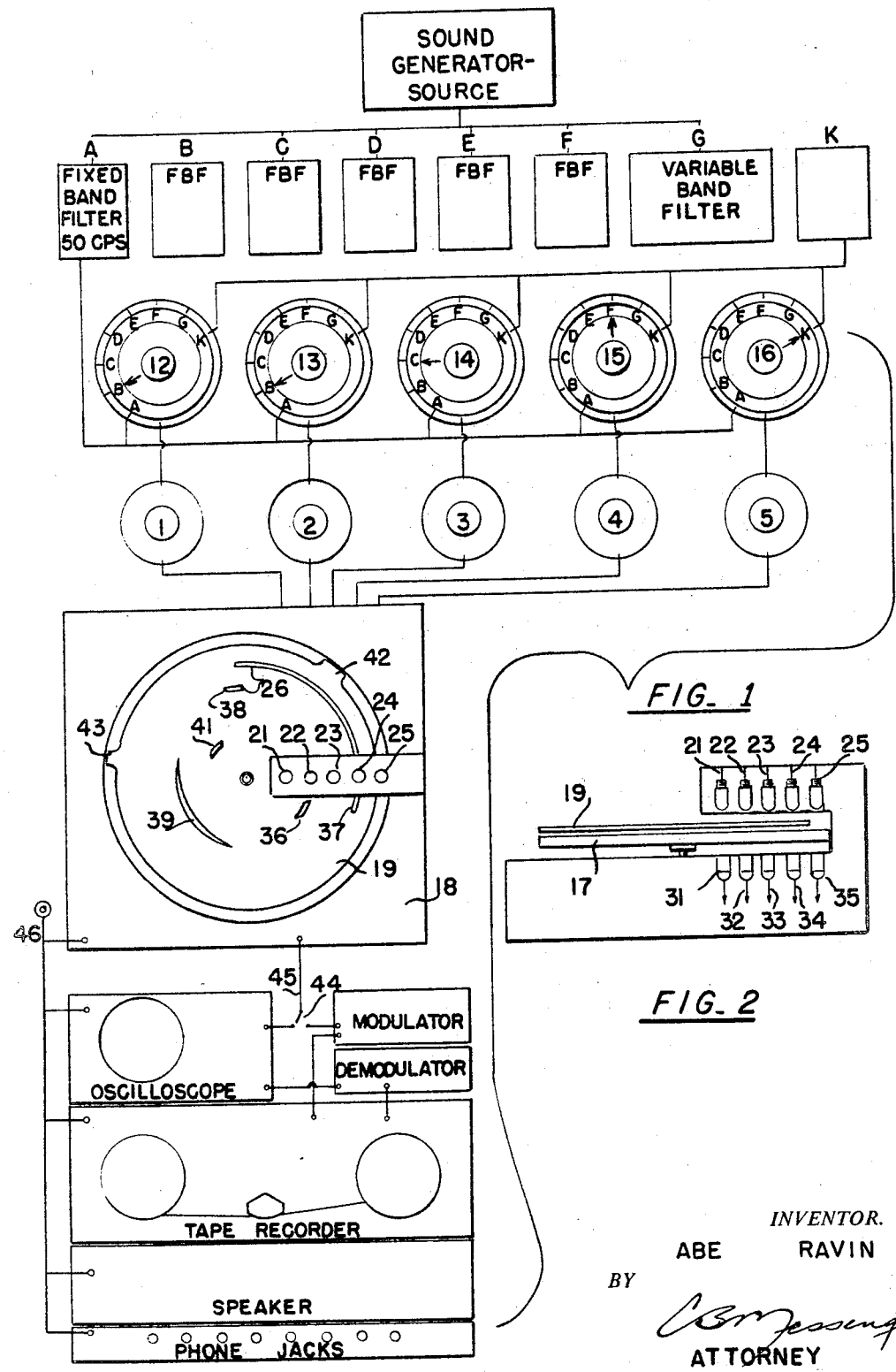
FIG. 2 is a side elevation in partial section showing features of a turntable component of said first embodiment.

Briefly stated, the illustrated embodiments of the invention include elements or components which separately store or generate sound sources so that separate components of a desired sound combination may be selected and combined to simulate or duplicate the sounds that are characteristic of the human heart. In the first embodiment of the invention a white sound or speech sound generator which is capable of producing all of the vibration frequencies desired is connected to sound filtration apparatus in which the sound generator output is broken down into desired sound components of different frequencies. In the second and third embodiments of the invention the individual sound components have been peviously generated and are stored for reuse on tape recorders or on an optical sound track.

After the separate desired sound components have been derived, the sounds are selectively recombined in a cyclic pattern which is characteristic of a human heart cycle. In the sound recombination function of all illustrated embodiments of the invention, the components sounds are released (or stopped and started) by circuits which are photoelectrically controlled. A rotating or moving member which has spaced light apertures moves past a light source and photo cell to control the emission of component sounds or electronic vibrations. The same or similar purpose could be served by electronic or other switching means so long as provision is made for varying the time interval of the full simulated heart cycle.

The particular component heart sounds are recombined into a sound output circuit by the photoelectric controlled switching device so that an output signal which closely simulates the vibration and cyclic pattern for heart sounds may be duplicated. This combined output signal can then be fed to a tape recorder, a loud speaker or to individual phone or stethoscope jacks to be used for instructional or diagnostic purposes. At the same time that the heart sounds are segregated, combined and displayed, it has been found desirable to provide a simulated electrocardiogram so that the student or physician can observe the relationship between the heart sounds and the heart's electronic impulses. As in the previous instance, the timing and presentation of the electrocardiogram is controlled by a photoelectric circuit that is interrupted by a moving masking member. The electrocardiogram signal can be fed to an oscilloscope or it can be modulated to be recorded on a tape recorder for subsequent reuse.

Before separately describing the particular features of each of the separate embodiments of the invention, it is thought best to discuss some of the underlying principles which were observed before the present instruments were developed. First, the actual sounds made by the human heart were carefully analyzed to determine the sound frequencies that might be associated with different heart functions. By careful screening of actual heart sounds, as observed by stethoscope and by analysis of heart sounds that had been recorded, a table of the sound frequencies that are related to different heart functions has been derived. A partial table of such heart sounds would include the following:

TABLE I

| | Frequency band |
|---|---|
| First heart sound | 70–110B |
| Second heart sound | 80–125C |
| Opening snap of mitral valve | 110–140 |
| Atrial and third heart sound | 50 |
| Harsh murmur—aortic and pulmonic stenosis | 180–460 |
| High-pitched murmur — mitral insufficiency and aortic insufficiency | 380–410F |
| Medium-pitched murmur—(rough murmur) aortic and pulmonary flow murmurs | 160–220 |
| Low-pitched murmurs—(rumbling murmurs) mitral stenosis | 70–110 |

From this table it is seen that the first heart sound has been observed to have a mixed frequency of from 70 to 110 cycles per second. The other characteristic heart sounds likewise have output frequencies that irregularly range up and down in a random mixing through the frequency limits set forth. Observation of the heart sounds of patients having known heart deficiencies has likewise been made to determine some of the specific sound characteristics that might be associated with such deficiencies.

Having made observations of these characteristic heart sound frequencies, it was next desirable to see if the component sounds might be recombined in a pattern which would duplicate or simulate the total sounds made by the heart. In order to do this it was necessary to determine not only the frequency of the separate heart sound components but something about the time relationship each to each of these separate sound components when observed or heard in a characteristic heart cycle. Having broken the heart sounds down to their base frequencies and to the time relationships for the application of the separate component sounds, the next requirement was an instrument which would make a recombination of such component sounds in the desired time duration and time spaced pattern possible. The objectives guiding the development of such an instrument have been set forth above.

Features of a first embodiment of the invention are shown in FIGS. 1 and 2. Here, as indicated by the block diagram, a sound generator-source is connected to various units inclusive of several separate fixed band filters A through F and a variable band filter G. The filter units are further connected to a plurality of selectors 12 through 16. Each of these selectors is interconnected to each of the fixed band filters, the variable band filter and an electrocardiogram source K. In the FIG. 1 illustration the particular connections are shown only for the 50 cycle per second fixed band filter A and for the electrocardiogram source unit K, but it is to be understood, however, that each of the remaining fixed band filters B through F and the variable band filter G are similarly connected to each of the selectors 12 through 16. Accordingly, the output from any of these units may be coupled through any of the separate selectors 12 to the gain control circuits represented by gain controls 1, 2, 3, 4 and 5. In other words, the output from any of the blocks A through G or K may be coupled through any of the separate selectors 12, 13, 14, 15, 16 to the circuit gain controls 1–5.

The output from gain controls 1 through 5 is connected to photoelectric assemblies 21, 22, 23, 24 and 25 in the turntable unit, with the actual circuit being connected through the photoelectric cells or resistors 31 through 35, respectively, of such assemblies. On the turntable unit a turntable support 17 is provided which can be rotated at speeds between 15 and 85 revolutions per minute with the speed being controlled by a speed control 18, the mechanism of which is of conventional type to effect such desired r.p.m. changes. The turntable support 17 is open, transparent, or at least translucent, in the zones corresponding to the positioning of the photoelectric assemblies 21 through 25. This light admitting turntable provides support for a rotating disk 19, which is opaque except for the control openings or slots 26 therein. These slots are likewise positioned for registration with the photoelectric assemblies 21 through 25, and they serve to pass light from the light sources of such assemblies to the photoelectric resistors 31 through 35 at desired intervals. The photoelectric cells or resistors are themselves connected in their respective circuits in such manner that the reduction in the resistance of the photoelectric resistors when the cell-resistor is exposed to light allows the total circuit to conduct when the resistor is so exposed. With this arrangement it is possible to couple the variable frequency discharge from any of the filters A through G through any of the selectors 12 through 16 to be amplified by the associated gain controls 1 through 5 and to be released, controlled or interrupted by operation of the photoelectric cell-resistors 31 through 35 before such signals are recombined in the output circuit of the turntable unit for transmission or usage in the additional components, as illustrated.

In use the output frequency bands of the different fixed band filters will be selected to duplicate the more commonly observed heart sound impulses. The variable band filter G which should be capable of frequency separation through the total range of experienced heart sounds can then be used to provide any specific desired output frequency that is not already presented by the fixed band filters A through F.

For any particular heart sound demonstration the desired frequency ranges will be coupled through use of the selectors into the circuits 1 through 4, while the fifth circuit will be reserved for the output from the simulated electrocardiogram source K.

For the control disk 19 shown on the turntable unit the characteristic sounds of a heart function in which systolic and diastolic murmurs are noted can be duplicated if the output of fixed band filter B is connected into channels 1 and 2 while filter C is connected into channel 3 and F is connected into channel 4. With this arrangement the cutout 36 in passing photoelectric assembly 22 will simulate a first heart sound, while cutout 37 in passing photoelectric assembly 24 will simulate a high pitched systolic murmur. Cutout 38 which will be triggered as the systolic murmur is cut off will represent the second heart sound, and cutout 39 which will rotate past the photoelectric assembly 22 will duplicate a low pitched murmur in a time position corresponding to any diastolic murmur. This diastolic murmur will ordinarily be preceded by a snap which is duplicated when the cutout 41 moves under the photoelectric assembly 21 to release sounds of fixed band filter B which are coupled through circuit 1.

With this arrangement, as the disk rotates at a speed corresponding to the pulse rate that is to be simulated, a combined sound output will be derived which closely simulates the sounds emitted by a human heart. In order to control the time spacing and the duration as well as the intensity pattern of separate heart sounds, different disks may be provided. The shaping of the light aperture openings can likewise be changed in order to simulate noted variations in the sound produced by the hearts of patients. A tapered cutout, such as that provided by the cutout 39, can be used to simulate a heart sound which increases in intensity from faint to loud and then decreases in intensity from loud to faint. This condition, which is termed a crescendo-decrescendo heart sound, can be duplicated by proper shaping of the control cutouts as illustrated.

The cutout 37 which has sharp beginning and terminal edges likewise duplicates an observed heart sound condition, but does not necessarily give an immediate full volume sound impact. Slanted entrance and exit cuts as illustrated in 36 and 38 have been derived to duplicate other observed heart sounds. In the design of the cutout shapes an observed time lag in the functioning of the photoelectric units has been taken into account. For the particular photo resistors initially used, an elasped time lag of 500 microseconds between the time of initial light exposure and the time for full photoresistance drop has been noted. Correction for this inherent time lag can be provided by proper design and placement of the disk cutouts.

The combined sounds as they are released by action of the photoelectric assemblies are directed to output circuits of the turntable unit 18 where they are recombined to make a total heart cycle sound. This total heart cycle sound will be released at a repetitive rate as determined by the setting for the turntable speed control 19. If a high pulse rate is to be simulated, the turntable will, of course, be speeded up while slow pulse rates can be duplicated by slower rotative rates for the turntable 17 and control disk 19. For the purposes of student instruction this simulated pulse rate can be slowed considerably below normally observed heart pumping rates. Even though the repetitive rate is lowered to the lower limits possible through use of the speed control 19, the actual sounds emitted in the cyclic position as determined by the positioning of the cutouts will not itself be distorted. In other words, the sound emitted while the cutout 36 or 39 passes under photoelectric assembly 22 will always be at a rate of 70 to 110 cycles per second even though the total release time for each of said sounds may be increased as such as five tides by varying the r.p.m. of the turntable.

This non-distortion of the released sounds when the simulated heart cycle rate is slowed represents a considerable advantage over previous heart sound recordings where any reduction in cycle rate would cause a corresponding change in the frequency rate of the heart sounds themselves. A change in the play-back speed of usual recordings, of course, causes a distortion of the sound which might be misleading to the student observer. With the present apparatus no sound distortion occurs, and the student may be first introduced to the heart sounds at a low repetitive rate so that he will become thoroughly familiar with the individual component sounds before the apparatus is speeded up to develop heart sounds at a normal observed heart pumping rate. Whether the derived sounds are presented at a speeded or slowed rate, they will all be combined at the output circuits of the turntable unit. These output signals can selectively be introduced to a tape recorder, an oscilloscope, a loud speaker or to individual phone jacks, or to any combination of such units as will best serve the demonstration purposes.

Further, it should be noted that the sounds of an individual heart function may be displayed alone if the other selectors are turned to an off position. When identification of separate heart sounds is being taught or demonstrated, this ability to cut in or to cut out individual sounds has proved to be advantageous. In similar manner, when identification of a particular heart sound is being taught, it is advantageous to slow and speed the repetition rate and to add and subtract other heart sounds and background noises. Once the listener's attention is fully focused on the particular sound of interest, such sound can still be identified though it becomes masked with other, even overlapping, sounds. The oscilloscope pattern for individual sounds or for a full combined simulated heart sound has likewise been found to be a useful tool in the teaching of heart auscultation.

A primary use of the oscilloscope, however, is in the presentation of a simulated electrocardiogram which corresponds to the manufactured total heart sound being presented by the apparatus. In order to derive a simulated electrocardiogram which will at all times be keyed to the repetitive rate for the heart sounds, means is provided whereby the electrocardiogram itself will also be controlled by the turntable unit and rotating disk 19. Since an electrocardiogram is essentially a signal trace of pulse signals corresponding to heart action, a modification of circuits is required for the presentation of a simulated electrocardiogram signal. Since it is still desirable, however, to control the emission of such pulsed signal by the rotating disk, photoelectric means is also used for controlling the release of such pulsed signal.

The concept adapted in connection with the present embodiment of the invention is to again use the resistance characteristics of a photoelectric resistor but to use such characteristics in a different manner. The electrocardiogram source K is designed to provide a voltage output signal which is in the present embodiment coupled through selector 16 and circuit 5 to photoelectric assembly 25. The light source for this assembly, however, is normally uninterrupted; accordingly, the resistance of the photo resistor 35 is normally at a low value. With this condition a constant voltage signal will be passed by the photoelectric cell-resistor 35 to the electrocardiogram output 45 which is coupled to the oscilloscope. Instead of providing cutouts on the disk 19, the disk is provided with intercept ridges 42 and 43 which extend outwardly from the disk 19 to briefly cut off the passage of light from the assembly 25 to the photoelectric cell-resistor 35. As these intercept ridges cut off the light transmission, the resistance of the photo resistor 35 will be abruptly increased. This increase in resistance will cause an increased voltage output in the circuit, and a voltage pulse will, accordingly, be transmitted by the electrocardiogram circuit 25 to the oscilloscope or to a modulator depending on the positioning of switch 44. If the signal is directed to the oscilloscope, the voltage pulse will be observed on the scope. This pulse can with proper regulation be superimposed on the wave form patterns established by the sound output. The positioning and form of the intercept ridges on the disk 19 can, of course, be modified to simulate known electrocardiogram conditions for normal and abnormal or deficient heart functions.

The modulator and demodulator components illustrated are provided for use when it is desired to record the electrocardiogram signal on the tape recorder. Since the pulsed voltage signal on the electrocardiogram would be disruptive of normal recording processes, it has been found desirable to modulate such pulse signal before it is introduced into the tape recorder. Then if the signal is later to be displayed on an oscilloscope as the recorded heart sounds are being demonstrated, the recorded electrocardiogram signal can be placed through a demodulator before being introduced to the oscilloscope. The fact that both the heart sounds and the simulated electrocardiogram can be preserved on a tape recorder is of importance in the use of the described instrument.

Where individual doctors, students or groups interested in the study of heart auscultation cannot be provided with the full instrument, it has been found to be desirable to use recordings made by the instrument in connection with the instruction or diagnostic determinations of such groups. The tapes which can, of course, be provided at relatively low cost can be programmed to emphasize most of the teaching techniques which are available in the use of the instrument itself. Since a voice pickup 46 can be used simultaneously with the other components of the instrument, the heart sounds and electrocardiogram that are to be recorded can be accompanied by a lecture presentation which will serve to identify and emphasize the recorded materials. The voice pickup which is provided for this purpose can be selectively coupled into the loud speaker or phone jacks as well as the tape recorder so that lecture materials can be disseminated at the same time that the heart sound simulator is being used or when a demonstration is made through use of prerecorded tapes. This voice pickup 46 can also be used for the introduction of additional extraneous or background noises of any type. Other recorded body sounds may be introduced to simulate the background noises that often mask heart sounds to complicate patient diagnosis. The introduction of this and other types of extraneous noise has been found useful in teaching the identification of specific heart sounds which could not previously be observed in patients by even experienced practitioners.

All of the components of the described embodiment of the invention mutually contribute to a system or combined instrument which fully meets the stated objectives. It should be noted, however, that some of the separate components or combinations of less than all of said components can be beneficially used to aid the teaching of heart auscultation. The use of such components or of recordings made by such instruments are considered to be within the stated objects of the invention. While photoresistor circuits have been described, any linear controllable resistance could be used, such as a Hall-effect device or a unijunction transistor, etc.

The beneficial advantages of the invention can be provided by other means. Accordingly, separate embodiments of the invention are shown in FIG. 3 and in FIGS. 4 and 5. In the FIG. 3 embodiment a turntable unit similar to that shown in FIGS. 1 and 2 is again used to provide a mixed output signal. The input to such turntable unit, however, is derived from prerecorded tapes instead of from the output of fixed band and variable band filters. Preferably, at least two multichannel tape recorders 51 and 52 are used. These tape players can be of an endless tape type which will constantly provide output signals of the desired frequency ranges on one, two or more channels of the players 51 and 52. The units to be described each provide two separate signals identified as Tape 1, Tape 2, Tape 3 and Tape 4. These signals may be selectively coupled through selector switches 61, 62, 63 and 64 and through gain controls 71, 72, 73 and 74 to the turntable signal mixer unit 68. At the same time additional signals, such as voice description or background noises, may be introduced through any of the separate selector switches by use of the external plugs 76, 77, 78 or 79.

A meter 81 is also provided which may be used after proper positioning of the selector switch 65 to read the intensity of the output signal from any of the Taps 1 through 4 or any of the external inputs 76 through 79 so that the intensity thereof may be closely regulated and balanced through manipulation of the gain controls 71 through 74. Output selector 85 is also provided for interconnection in the system so that the output of any single input signal can be coupled through the audio gain 86 and amplifier 87 to an external speaker jack 88 or to an internal speaker 89. This same output selector 85 can also be used to interconnect the mixer output of the entire turntable unit 68 to said outputs 88 and 89. In other words, when the selector 85 is moved to any of the Out positions, the combined signal derived from the signal mixer turntable unit will be available for amplification and distribution. If the selector is moved to the 1, 2, 3 or 4 position, the output of the separate Tapes 1, 2, 3 or 4 or of the external inputs 76 through 79 may be amplified.

As in the previous embodiment, the turntable unit again provides for an electrocardiogram output so that an electrocardiogram signal derived as previously described may also be displayed simultaneously with the builtup heart sounds obtained through the selective combination of signals from Tapes 1 through 4. Modulator and demodulator components are provided so that the output electrocardiogram signal may again be stored on tape if it is not immediately desired to display the electrocardiogram signal on an oscilloscope which may be connected to the electrocardiogram outlet 91. As in the previous embodiment, the combined or individual signals may be displayed on an oscilloscope, recorded on a tape recorder or be distributed to a speaker or phone jacks for the audio reception of interested groups or individuals.

The difference between the first and second embodiments of the invention is involved in the source of the sound input signals. In this embodiment the component sounds are obtained from tape or record sources, and, accordingly, sounds of different quality are obtainable. While it is preferred to have the recorded signals that are to be continuously run on Tapes 1 through 4 of a mixed sound character varying over a narrow band similar to the band outputs of filters A through F of the original embodiment, it is conceivable that such signals could be of a single fixed frequency. It is also quite possible that such input tape recordings could be derived from actual heart sounds processed to provide a continuous signal.

In the further embodiment of the invention as shown in FIGS. 4 and 5, it is intended to provide a source for the sound signal and the gating or control for emission of the sound signals in a single structure component. Here the turntable unit 91 provides concentric drive shafts 92 and 93 which may be run at independent speeds. The outer shaft 92 is coupled to a support plate 94. The plate 94 is preferably of translucent material so that a plurality of light intercepting bands 95, 96, 97, 98 and 99 may be disposed thereon. The separate bands are provided with different light transmission patterns due to the spacing of the light and dark spots or lines and marks 100 in the band. For each of the bands 95 through 99 the frequency or repetitive cycle of light and dark space combinations is different either in the actual spacing of the pattern or due to the changed peripheral speed for the band in its particular radially spaced position on the plate 94. The purpose of such time and position spacing is to provide a light interruption pattern which will generate different frequency signals in the photosensitive pickup components of the assembly. In essence it is intended that the light bands 95 through 99 and the associated photosensitive components 105 through 109 will be usable to generate a sound signal in a manner similar to that presently used for the production of sound in sound moving pictures.

In order to obtain the identical quality and tone of sound at all times that the unit is to be used, it is preferred that the sound generating disk 101 and support plate 94 be rotated at a constant speed. Accordingly, the shaft 92 is coupled directly to a drive motor 102 by the intermediate drive gears 103. In order to combine the output signals that might be derived from the interaction of the light bands 95 through 99 and the photosensitive components 105 through 109 to obtain a simulated heart sound, it is again desirable to provide a mask or control disk 111 that may be superimposed above the light bands 95 through 99. Since it is desirable to have different control disks to exhibit different heart conditions, it is advisable to again provide a transparent support plate 110 attached to the shaft 93 upon which control disks 111 of paper or cardboard may be placed. Control slots 115, 116, 117, 118 and 119 can again be provided in the opaque control disk 111 to regulate and time the emission of signals by the photosensitive components 105 through 109 as the slots 115 through 119, respectively, come into position of alignment with the photo assemblies.

An additional photosensitive assembly 121 may be provided in position adjacent the edge of the control disk 111 to be periodically blocked by the intercept ridges 122 and 123. These ridges on the disk 111 and photosensitive assembly 121 will cooperatively provide an electrocardiogram signal in timed sequence with the heart sounds emitted or controlled by the slots 115 through 119 of the disk 111.

While the time pattern for the heart sounds and electrocardiogram is regulated by the spacing of the slots and ridges as in the first embodiment, the actual speed, repetitive cycle or pulse rate will be controlled by the variable speed mechanism 125 shown in FIG. 5. The speed change mechanism illustrated utilizes variable speed pulleys with the flanges of pulleys 124 and 126 being laterally movable to effect a speed change for the shaft 93 as compared to the constant speed of the shaft 92. As in the previous instance, the machine should be able to simulate pulse rates varying over a wide range. Whether the machine is operated at a slow rate or at normal heart rates or above, the output signal will not be disturbed, since the scanning speed of the light bands 95 through 99 past the photosensitive components 105 through 109 will not be changed. It is intended, however, that the sound generating disks 101 may themselves be changed if it is desirable to obtain sound signals of a different frequency pattern than that provided by the initial light bands 95 through 99.

The output from the mechanism shown in FIGS. 4 and 5 can be substituted for the tape sources 51 and 52 and the sound mixer 68 of the FIG. 3 embodiment or for all the components in the FIG. 1 embodiment ahead of the turntable unit 18 if suitable volume control and switching is provided to select and control the amplification of the individual and combined outputs of the photosensitive assemblies 105 through 109 and 121. Obviously, a unit of this type could be combined with the oscilloscope, modulator-demodulator, tape recorder, speaker and phone jacks components of the previous embodiments.

While separate embodiments of the invention have been shown and described in satisfaction of the stated objectives, it should be obvious that the embodiments themselves or the overall concept might be satisfied by other embodiments, modifications or changes. All such modifications, changes, revisions, adaptations or concepts coming within the scope of the appended claims are to be considered a part of this invention.

What is claimed is:

1. An instrument for the simulation of the component and combined sounds of the heart comprising a source for multiple frequency bands of sound energy with each band of sound corresponding to separate heart sound components, and signal gating means for selectively releasing said sound energy in a cyclic pattern characteristic of a heart pulse rate.

2. Apparatus as set forth in claim 1 inclusive of means for varying the time rate of said cycle without distortion of the tone of said sound energy for the simulation of variable heart pulse rates.

3. Apparatus as set forth in claim 1 inclusive of means for the introduction of additional sound components as background noise and audio information disseminated independently of said cyclic patterned sound energy.

4. Apparatus as set forth in claim 1 wherein said signal gating is provided by photosensitive means for separately controlling the release of separate band sounds.

5. Apparatus as set forth in claim 1 for the additional simulation of the electromotive output of the heart and further comprising a source of electrical energy, and means coactive with said signal gating means for selectively releasing said electrical energy in pulsed charges characteristic of a heart electrocardiogram whereby both heart sounds and an associated electrocardiogram may be simulated.

6. Apparatus as set forth in claim 5 inclusive of recorder apparatus whereby the simulated heart sound and electrocardiogram derived from said instrument may be preserved for subsequent representation.

7. Apparatus as set forth in claim 6, further inclusive of modulator and demodulator components whereby said electrocardiogram signal may be played back and observed on an oscilloscope.

8. Apparatus as set forth in claim 4 wherein said signal gating means is inclusive of a moving control element providing light transmitting apertures therein in positions for registration with said photo-sensitive means.

9. Apparatus as set forth in claim 1 inclusive of a source of sound energy of variable frequency in a frequency range substantially corresponding to that of speech sound and further comprising band filters for dividing said sound energy into the desired multiple frequency bands.

10. Apparatus as set forth in claim 1 wherein said multiple frequency bands of sound energy are derived from separate recorded sound energy sources.

11. Apparatus as set forth in claim 1 wherein said multiple frequency bands of sound energy are derived from means inclusive of a moving member, a plurality of variable light transmitting sound tracks on said moving member, and photosensitive means for the detection of said variable light pattern and the production of said sound energy.

12. Apparatus as set forth in claim 11 wherein said signal gating is provided by photo-sensitive means.

13. Apparatus as set forth in claim 12 inclusive of means for varying the speed of said photo-sensitive signal gating means.

14. Apparatus as set forth in claim 8 wherein the shaping of the apertures in the moving control member may be of distinctive size and shape to control the intensity, duration and quality of the transmitted sound energy signal.

15. Apparatus as set forth in claim 9 wherein said band filters provide sound energy in a plurality of frequency bands in excess of the frequencies usually required for the simulation of specific heart sound characteristics, said apparatus being further inclusive of selector means for obtaining desired combinations of said component heart sounds or sound energy bands and gain control means for balancing the output level of selected frequency band sound sources.

References Cited

UNITED STATES PATENTS

| | | |
|---|---|---|
| 2,110,358 | 3/1938 | Driesbach. |
| 2,425,122 | 8/1947 | Petty et al. _____ 35—14 X |
| 2,660,720 | 11/1953 | Dehmel _____ 35—14 X |
| 3,228,120 | 1/1966 | Farrell _____ 35—14 |
| 3,233,344 | 2/1966 | Hartley _____ 35—14 |

EUGENE R. CAPOZIO, *Primary Examiner.*

H. S. SKOGQUIST, *Assistant Examiner.*